United States Patent [19]

Wang et al.

[11] Patent Number: 4,770,486
[45] Date of Patent: Sep. 13, 1988

[54] OPTICAL SYSTEM FOR POWERED SURGICAL INSTRUMENT SYSTEM

[75] Inventors: Carl C. T. Wang, Piedmont; Donald A. Parker, Berkeley, both of Calif.

[73] Assignee: Alcon Laboratories, Inc., Fort Worth, Tex.

[21] Appl. No.: 780,554

[22] Filed: Sep. 26, 1985

[51] Int. Cl.$^4$ ............................................. G02B 6/24
[52] U.S. Cl. ................................... 350/96.20; 362/32
[58] Field of Search ............... 350/96.10, 96.15, 96.18, 350/96.20, 96.21, 96.22, 96.24, 96.25, 96.26; 362/32

[56] References Cited

U.S. PATENT DOCUMENTS 4,297,000 10/1981 Fries .................................. 362/32 X
4,557,554 12/1985 Blanc ................................. 362/32 X
4,613,931 9/1986 Messinger ......................... 362/32 X

OTHER PUBLICATIONS

CooperVision Brochure, CooperVision System Six ™.
Site TXR System 2000 Brochure.

Primary Examiner—Eugene R. Laroche
Assistant Examiner—Steven J. Mottola
Attorney, Agent, or Firm—Ciotti & Murashige, Irell & Manella

[57] ABSTRACT

There is disclosed a receptacle for a plug on the end of a fiber optic light guide probe used for projecting light into an area in which a surgeon is operating, said receptacle serving to prevent heat transfer from light source to the plug of said probe. A shoulder in the bore of the receptacle engages another shoulder on the plug with minimal area of contact to minimize the area of potential heat transfer. The dimensions of the central bore of the receptacle relative to the plug are such that an air gap exists all around the plug when inserted in the receptacle. The plug is provided with an insulating sleeve behind the plug shoulder, and this sleeve is mechanically supported by a Delrin plate and insert which give the system mechanical support and which minimizes heat transfer between the mechanical support of the receptacle and the plug because of the poor heat conductivity of plastic. There is also disclosed a light concentrator comprised of a parabolic mirror which concentrates light from an input cone entering an input aperture of the mirror into a smaller output aperture of the mirror in which the tip of a fiber optic bundle resides.

15 Claims, 2 Drawing Sheets

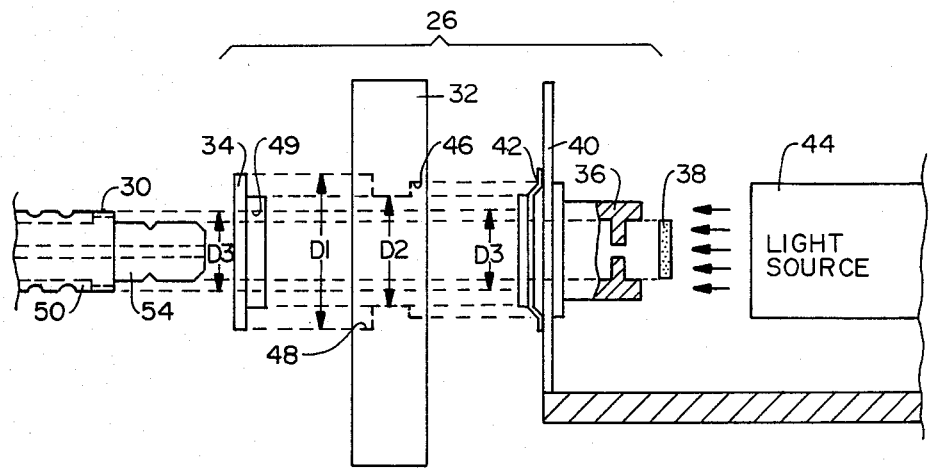
FIG. 2
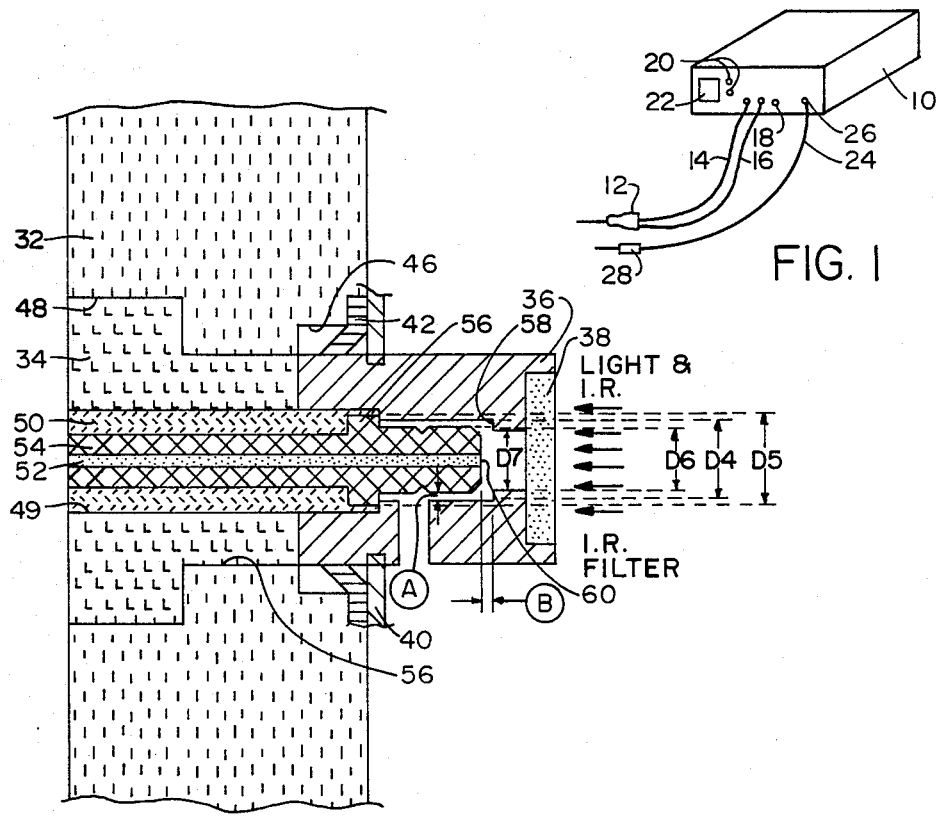
FIG. 1
FIG. 3

OPTICAL SYSTEM FOR POWERED SURGICAL INSTRUMENT SYSTEM

BACKGROUND OF THE INVENTION

The invention pertains to the field of fiber optic light sources in surgical instrument systems that provide certain functions and support to surgeons performing various forms of surgery, particularly ocular surgery. In particular, the invention relates to the field of construction of the receptacles for the input end of fiber optic probes and a light concentrator to increase the amount of captured light.

Surgeons very often need very powerful light sources to work in small, dark spaces in the body. Such light sources must provide intense, uniform light but must not be bulky so as to interfere with the surgeons manipulation of his cutting instruments. Fiber optic light sources fill this need nicely since they can conduct light from powerful light sources along a small optical fiber and project it from the tip of a narrow probe into the particular area in which the surgeon is working. The problem with this arrangement is that very powerful light sources are used. Light sources of 75 watts or more are typical. To capture the maximum amount of light, the input end of the fiber optic probe must be placed fairly close to the light source, since the intensity of radiated energy decreases as the square of the distance. The ends of fiber optic probes must be supported by metal or other rigid materials because fiber optic lightguides are quite small and flimsy. Naturally this rigid support material has more mass and thermal storage capacity than the fiber itself. Since it is located so close to a light source which radiates infrared radiation as well as visible light, and since convection currents carry further heat from the light source to surrounding objects, the fiber support can become quite hot during the course of an operation. Generally, the fiber optic support is shaped in the form of a plug which can be plugged into a receptacle in front of the light source. This allow the fiber optic probe to be removed for autoclave treatment prior to the next operation so as to sterilize it. If this plug becomes hot over the course of a long operation, and a surgeon or nurse who must unplug the fiber optic probe does not anticipate this fact, then burns of the fingers can result.

SUMMARY OF THE INVENTION

The invention is a receptacle system for the input end of a fiber optic probe which filters out incoming infrared radiation, prevents contact between the plug end of the probe and the receptacle itself except for a minimal area and which slows the conduction of heat from the area of the receptacle closest to the light source and the area of contact between the plug and the receptacle. The invention also contemplates use of a parabolic or archimedes spiral mirror non-focusing light concentrator which accepts light in an input cone entering the input aperture of the light concentrator and concentrates it into an output aperture approximately 4 times smaller than said input aperture. The tip of a fiber optic bundle resides in or near said output aperture. The shape of the parabola and the diameter of the output aperture are selected such that the focal point of each line in the parabolic surface is a point on the diameter of the output aperture where a diagonally opposite line in the parabolic surface intersects said output aperture.

BRIEF DESCRIPTION OF THE DRAWINGS

FIG. 1 is a schematic block diagram of a typical surgical instrument system which could utilize the system.

FIG. 2 is an exploded view of the relationship of the various structural elements which make up the the invention.

FIG. 3 is a cross-section of the invention with the fiber optic probe plug end inserted.

DETAILED DESCRIPTION OF THE PREFERRED EMBODIMENT

Figure 4:
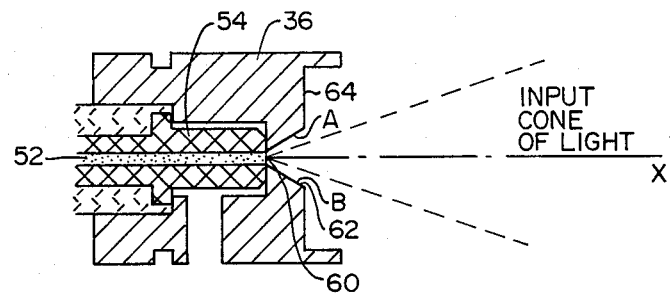
FIG. 4 is a cross section of another embodiment for the receptacle of the invention using a parabolic concentrator aperture behind the infrared filter.

Referring to FIG. 1 there is shown a surgical system typical of a system which might use the invention. A system unit 10 is comprised of sources of electrical power, pneumatic air pressure and vacuum for driving and supporting various surgical instruments such as a pneumatically driven vitrectomy probe such as the probe 12 which has a pair of tubes 14 and 16 carrying pneumatic air pressure to the probe to drive it and vacuum to aspirate away cut tissue and fluids. The system unit has another pneumatic port 18 which has pneumatic air pressure supplied to it in proportion to the setting of some control. Such a port can be used to drive such instruments as scissors (not shown). The system unit also has controls 20 for controlling various functions and a display 22 for indicating various parameters characterizing the functions which are being controlled. The above description of a typical system unit is intended to be exemplary only, since the invention can be used in any one of a wide variety of surgical instruments of vastly different purpose and function.

Whatever the surgical instrument in which the instrument is employed, there will be a light source (not shown) coupled to the system unit for supplying light to be guided from a socket or receptacle 26 to the area of the operation by a fiber optic lightguide 24 which projects the light out from the end of a probe 28 which can be placed at the sight of the procedure.

FIG. 2 shows an expoded view of the relationship of the plug end 30 of the fiber optic lightguide to the various structural elements which make up the receptacle 26. FIG. 3 shows a cross section of the invention with the plug end of the fiber optic probe inserted. Referring jointly to FIGS. 2 and 3, the receptacle is comprised of a Delrin TM plate 32 to provide mechanical support for the plug in addition to the support provided by a receptacle portion 36, a Delrin insert 34, a receptacle 36, an infrared filter 38, a support member 40 and a clip 42 attached to the support member 40 which engages the receptacle 36 and holds it in place in a hole in the support member 40.

The support member 40 can be part of the front panel of the system unit, and it has a hole in it which is large enough to allow the receptacle 36 to fit therein. The receptacle is preferably cylindrical in shape, and has a centered, symmetrical, cylindrical bore through the center thereof which has several different diameters as shown in FIG. 3 the purpose of which will be explained below. The outside of the receptacle is cylindrical 36 and may or may not have groove which is engaged by the clip 42 to hold the receptacle 36 in place in front of a light source. Any manner of holding the receptacle 36 in place relative to the support 40 is acceptable for purposes of the invention.

A portion of the receptacle 36 extends outward from the support member 40. The Delrin plate 32 is mounted on the support member 40 by any conventional means such that an inset area 46 in the plate fits over the projecting portion of the receptacle 36 and the clip 42. The plate 32 also has another inset area 48 which is sized to receive the Delrin insert 34. The Delrin insert 34 has a cylindrical bore 49 which is sized to match the outside diameter of an insulating sleeve 50 on the plug end of the fiber optic waveguide. The plug end of the fiber optic waveguide is comprised of a fiber optic lightguide 52, a stainless steel plug and fiber support 54, and the insulating sleeve 50. The insert 34 is a disk-like shape which has two diameters: diameter D1 which matches the diameter of an inset area 48; and diameter D2 which matches the diameter of central bore 56 of the plate 32. The insert 34 is then placed in the plate 32 as shown in FIG. 3, and the plug end of the fiber optic probe is inserted through the insert 34.

The receptacle 36 has a first section of the bore therethrough which has a diameter D3 which matches the diameter of the insulating sleeve 50. Although the several matching dimensions in the invention which are noted herein are said to match, those skilled in the art will appreciate that certain tolerances will result from the manufacturing process and certain clearances will be specified to aid in ease of assembly and operation. These dimensional deviations from an absolute match are to be understood as existing in the preferred embodiment, and the amount of the clearance will be stated only when it has a direct bearing upon the essence of the invention.

The metal fiber support and plug 54 has a configuration which aids in the prevention of heat transfer to itself when engaged with the receptacle 36. A principle element of this configuration is the diameter of a shoulder 56 relative to the diameter of a second section of the cylindrical bore through the receptacle 36. The plug end of the fiber optic probe is comprised of a plug portion having a diameter D6 which terminates in an annular, cylindrical shoulder 56 which has a diameter D5. The second section of the cylindrical bore has a diameter D4 which is only slightly less than the diameter D5 of the shoulder. The amount of this difference should be enough to prevent the shoulder 56 from being capable of being pushed into the second section of the receptacle 36 yet not so much as to cause excessive area of contact between the shoulder 56 and the shoulder formed between the first and second sections of the receptacle 36. The first and second sections of the receptacle 36 are the sections of the cylindrical bores which have the diameters D3 and D4 respectively where D3 is larger than D4. The plug portion 54 of the fiber optic probe is made of stainless steel, a relatively poor conductor of heat, so as to minimize heat transfer over the overlapping metal to metal contact region. In embodiments where the light concentrator is not used, the receptacle can be a high temperature plastic material or other rigid material which is a poor conductor of heat. Alternatively, when a concentrator is used, the receptacle can be made of a metal such as aluminum which can have polished surfaces but which is a good conductor of heat, or, preferably, can be made of a rigid material which is a bad conductor of heat but which can have a mirror surface formed thereon by some known process. The configuration of this light concentrator will be discussed below.

The plug portion of the fiber support and plug support 54 is stainless steel, a poor conductor of heat, has a diameter D6 which is fixed at a value relative to the diameter D4 of the second section of the receptacle 36 so as to always leave an air gap between the plug and the inside wall of the receptacle 36. This air gap has the dimension A which is equal to D4 minus D6, and serves as an insulating air space. The length of the plug 54 from the surface of the shoulder 56 closest to the light source to the tip of the plug is fixed at a dimension relative to the length of the second section of the receptacle 36 so as to leave a second air gap between the tip of the plug and a shoulder 58 formed between the second section of the receptacle and a third section of the bore of the receptacle. This second air gap has a dimension B which is equal to the difference between the length of the plug and the length of the second section of the receptacle bore. In another embodiment to be described below, this second air gap is reduced to zero so as to allow the fiber optic bundle to capture as much light as possible.

The third section of the bore in the receptacle 36 has a diameter D7 which is smaller than the diameter D4 of the second section. Its purpose in some embodiments is to cut the amount of infrared radiation which gets through the infrared filter 38 that can be radiated to the surface of the tip of the plug. In another embodiment to be described below, the preferred embodiment, the third section has a particular configuration and acts as a light concentrator. The diameter D7 in the embodiment presently being considered should be sufficiently smaller than the diameter D4 to cut the infrared radiation, without cutting off too much light from entering the exposed tip 60 of the fiber optic light guide. The amount of the difference between the diameters D7 and D4 depends upon the power of the particular light source used, the efficiency of the filter 38 and the distance between the tip of the plug and the surface of the filter 38 furthest from the light source 44. The amount of the difference is not critical to the invention, since the amount of infrared radiation which gets past the filter 38 should be very small. In fact this third section of the bore may be omitted altogether if the quality of the filter 38 is sufficient to filter out most of the infrared radiation.

The last section of the bore in receptacle 36 is an inset area which matches the dimension of a disk shaped infrared filter 38.

The combination of all the above element selections, dimensions, configurations and material selections results in minimal heat transfer from the light source 44 to the plug end of the fiber optic probe. The infrared filter 38 blocks most if not all the radiated heat energy from getting through to the body of the receptacle 36 and the tip of the plug. The light source 44 emits visible light, infrared and ultraviolet radiation. Only the visible light in the portion of the visible spectrum to which the eye is most sensitive should be coupled into the bundle since this is the light the surgeon's eye needs to see the operation area. All the other radiation outside this passband should be reflected or absorbed to prevent it from heating the patient's eye or damaging it with U.V. burn. The filter 38 is selected to pass only this passband of desired light. Generally the passband selected is user dependent, but the colors the eye is most sensitive to are well known and center in the yellow-green portion of the visible spectrum. Such filters are commercially available.

Any radiated heat or heat carried by convection currents which does heat the body of the receptacle and support member is prevented from being conducted to the metal of the plug by the several factors described above. As to the heat in the body of the receptacle 36, conduction of this heat to the metal of the plug is retarded by the minimized area of contact between the receptacle 36 and the metal fiber optic support and plug. This conduction can be further minimized by forming the receptacle and the plug 54 out of a plastic material which could withstand autoclave treatment but which does not easily conduct heat. Any heat in the support member 40 is prevented from reaching the metal of the plug 54 by the fact that the plate 32 and insert 34 are Delrin, a poor heat conductor relative to metal, and that these two elements contact only an insulating sleeve 50, and not the metal of the plug 54.

PARABOLIC CONCENTRATOR

Referring to FIG. 4 there is shown another embodiment of the receptable 36 using a parabolic concentration mirror 62 behind the infrared filter inset 64. The parabolic mirror is comprised of two polished surfaces A and B which reflect light. The purpose of this parabolic concentration mirror is to concentrate incoming light rays on the end 60 of the fiber optic bundle to allow more incoming light to be captured by the bundle. The fiber bundle 52 is selected to have an acceptance angle, for example 60 degrees, so as to maximize the efficiency of light capture for reasons which be explained more fully below. In the embodiment of FIG. 4, the dimensions and configuration of the plug 54 versus those of the receptacle 36 are selected to place the tip 60 of the fiber bundle in the hole at the end of the parabolic concentrator. This also is done to maximize the amount of light captured by the bundle. The parabolic mirror surfaces A and B define a parabola having in input aperture which is approximately 4.26 times as large as another aperture or hole formed at its narrow end. The purpose of the parabolic concentrator 62 is to concentrate light from the light source 44 in an input cone having rays which can be as much as approximately plus or minus 15 degrees to the X axis to pass through the aperture of the parabolic surface in which the tip 60 of the fiber bundle resides. That is, the parabolic concentrator concentrates light arriving in approximately a 30 degree cone to pass through a circular aperture which is about 4 times as small as the aperture of the parabolic concentrator. Such concentrators are known as Winston concentrators after the man who first used this geometry in the solar concentrator field for capturing solar energy.

Figure 5:
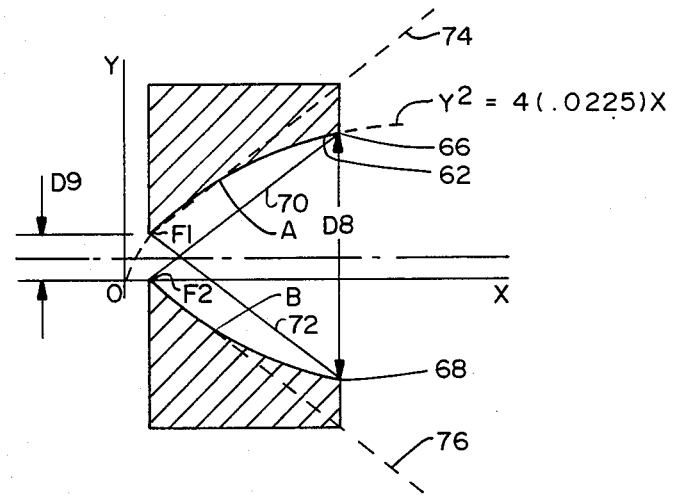
FIG. 5 is detailed view in cross section of the shape of the parabolic surface of the concentrator and a ray diagram showing its concentration effect.

FIG. 5 shows the details of the parabolic mirror 62 at a larger scale. The mirror is comprised of two surfaces A and B, each of which has a parabolic shape defined by the equation $$Y^2 = 4(0.0225)X \tag{1}$$

where X is the coordinate along an axis X beginning at the origin of the parabola and extending along the axis extending toward the light source, and Y is the coordinate along an axis Y beginning at the origin of the parabola and extending perpendicular to the X axis. The input aperture diameter D8 is approximately 4.26 times the diameter D9 of the output aperture in the preferred embodiment. The diameter of the fiber bundle 52 should be less than the diameter D9 for best performance.

The surface parabolas A and B do not have the same origin. If the surface A is extended at the end furthest from the light source, its origin is at a point along the Y axis which is even with the end of the polished surface B but removed therefrom along the X axis a distance toward the end of the fiber optic light probe. Likewise the polished surface B, if extended from its end furthest from the light source, would have an origin on the Y axis which is even with the end of the polished surface A but removed therefrom along the X axis a distance toward the end of the fiber optic light probe. The input cone of light has rays at all angles all angles to the X axis up to plus or minus 15 degrees, i.e., the cone angle is 30 degrees. This results from the reflector of the light source tending to cause the light rays to converge. The purpose of the light concentrator is to cause all input light in this input cone to impinge on the tip 60 of the fiber bundle by reflecting it so as to cause it to pass through the output aperture having diameter D9. Accordingly, the two reflecting surfaces A and B are shaped so that all light rays in the input cone which strikes either the surface A or the surface B will be reflected at such an angle so as to pass through the output aperture between points F1 and F2. The surface B is shaped such that the point F1 is the focal point, and the surface A is selected such that the point F2 is the focal point of the surface A. If one draws a line between the point F2 and a point 66 on the input aperture of the parabola, and draws another line between the point F1 and a point 68 at the other side of the input aperture of the parabola, the angle between the lines defines the maximum angle to the X axis which any reflected ray from the input cone will have. The shapes of the parabolas are selected such that the angle between these lines 70 and 72 is less than the 60 degree acceptance angle of the fiber bundle. This maximimizes the amount of light from the input cone which is captured by the bundle. In all embodiments to maximize the amount of the captured light, the fiber bundle properties and the location of the tip should be such that the angle of the acceptance of the fiber does not exceed the angle between the line 70 and 72. In FIG. 5, the acceptance angle of the fiber bundle is illustrated by the phantom lines 74 and 76. In FIG. 5 this acceptance angle cone is shown to be approximately equal to the angle of the cone defined between the lines 70 and 72 if they were rotated about the X axis, and this is the minimal configuration since it is preferable that the angle between lines 74 and 76 exceed the angle between the lines 70 and 72. The maximum distance the tip 60 of the fiber bundle should be away from the X location of the line between points F1 and F2 is the distance the intersection of the lines 70 and 72 would be behind the line between F1 and F2 if the lines 70 and 72 were moved without changing their angle with respect to the X axis so as to coincide with the lines 74 and 76. Another way of saying this where the lines 74 and 76 do not have the same angles as the lines 70 and 72 is that the tip 60 should not be further behind the line between F1 and F2 than the intersection of the line 70 and 72 would be if the line 70 was moved so as to pass through F1 without changing its angle and the line 72 was moved without changing its angle so as to pass through the point F2.

Although the invention has been described in terms of a preferred embodiment, those skilled in the art may recognize modifications or substitutions, for example, substituting an archimedes spiral mirror non-focussing light concentrator for the parabolic concentrator, which will work to practice the invention without departing from the spirit and scope of the invention. All such modifications and substitutions are intended to be included within the scope of the claims appended hereto.

What is claimed is:

1. An apparatus for preventing heat transfer from a light source to a plug of a fiber optic probe comprising:
   receptacle means near said light source for receiving said plug; and
   support means in said receptacle means and as part of said plug for coupling said plug to said receptacle for support with minimal surface area of contact between said plug and said receptacle means and further comprising means for causing an air gap between said receptacle means and said plug.

2. An apparatus for preventing heat transfer from a light source to a plug of a fiber optic probe comprising:
   receptacle means near said light source for receiving said plug; and
   support means in said receptacle means and as part of said plug for coupling said plug to said receptacle for support with minimal surface area of contact between said plug and said receptacle means and further comprising an infrared filter held by said receptacle between said light source and said plug.

3. The apparatus of claim 2 wherein said minimizing means includes an area of the bore of said receptacle having a reduced diameter to cut down on infrared radiation reaching said plug from said infrared filter.

4. An apparatus for preventing heat transfer from a light source to a plug of a fiber optic probe comprising:
   receptacle means near said light source for receiving said plug; and
   support means in said receptacle means and as part of said plug for coupling said plug to said receptacle for support with minimal surface area of contact between said plug and said receptacle means and further comprising a support for said plug comprising a plate made of a poor heat conductor mounted adjacent to said receptacle, said plate having a bore through which said plug is inserted into said receptacle.

5. The apparatus of claim 4 further comprising an insert of material which conducts heat poorly placed in said plate and having a bore through which said plug is inserted and an insulating sleeve around said plug between said insert and the body of said plug.

6. An optical system for minimization of heat transfer between a light source and a fiber optic probe having an input end and an output end and having a plug having a center axis at said input end comprising:
   a shoulder on said plug having a predetermined maximum dimension from the center axis of said plug;
   a receptacle having a central bore for receiving said plug;
   a shoulder in said central bore having a dimension which is smaller than the dimension of said shoulder on said plug to prevent said plug from penetrating said bore further than the position of said shoulder but having a dimension relative to the dimension of said shoulder on said plug so as to minimize the amount of contact between said shoulders, said plug having dimensions relative to the dimensions of said receptacle central bore so as to form an air gap around said plug between the outside of said plug and the inside of said central bore of said receptacle over substantially all the surface of said plug inside the central bore of said receptacle.

7. An optical system for minimization of heat transfer between a light source and a fiber optic probe having an input end and an output end and having a plug having a center axis at said input end comprising:
   a shoulder on said plug having a predetermined maximum dimension from the center axis of said plug;
   a receptacle having a central bore for receiving said plug;
   a shoulder in said central bore having a dimension which is smaller than the dimension of said shoulder on said plug to prevent said plug from penetrating said bore further than the position of said shoulder but having a dimension relative to the dimension of said shoulder on said plug so as to minimize the amount of contact between said shoulders and further comprising means to insure that when said plug shoulder and said bore shoulder are in contact, there is an air gap between said plug and said receptacle.

8. An optical system for minimization of heat transfer between a light source and a fiber optic probe having an input end and an output end and having a plug having a center axis at said input end comprising:
   a shoulder on said plug having a predetermined maximum dimension from the center axis of said plug;
   a receptacle having a central bore for receiving said plug;
   a shoulder in said central bore having a dimension which is smaller than the dimension of said shoulder on said plug to prevent said plug from penetrating said bore further than the position of said shoulder but having a dimension relative to the dimension of said shoulder on said plug so as to minimize the amount of contact between said shoulders and further comprising an infrared filter held by said receptacle between said plug and said light source.

9. The apparatus of claim 8 further comprising insulation material between said receptacle and said plug at all points except in the area of shoulder to shoulder contact.

10. An optical system for minimizing heat transfer between a light source and a plug at one end of a fiber optic light probe comprising:
    a receptacle having a central bore for receiving said plug; a shoulder in said bore having dimensions selected so as to contact a projection on said plug with the minimum area needed to prevent further penetration of said plug into said bore;
    an insulating sleeve around said plug at points behind said plug shoulder;
    means for insuring that when said plug is inserted in said bore fully, that an air gap exists substantially all around said plug such that the only contact between said plug and said receptacle is by said shoulder and at areas behind said plug shoulder protected by said insulating sleeve;
    an infrared filter held by said receptacle between said light source and said plug; and
    means for providing mechanical stability to said plug by supporting said plug's insulating sleeve using material of low heat conductivity.

11. An apparatus for concentrating light from a light source on the end of a fiber optic probe comprising:
    a fiber optic bundle having a light input end;

plug means for providing support for said fiber optic bundle;

a receptacle for holding said plug means;

mirror means in said receptacle for reflecting incoming light in an input cone so as to be captured by said fiber optic bundle, said mirror means being parabolic in the contour of the reflecting surface with an input opening and an output opening, said output opening surrounding said light input end where said input opening is approximately four times as large as said output opening and where the shape of said parabolic reflecting surface is defined by the equation:

$$y^2 = 4(0.0255)x$$

where x is the coordinate along an x axis extending from the origin of the parabola toward said light source, and y is the coordinate on any y axis perpendicular to said x axis of a point on the reflecting surface having the value of x for its x axis coordinate.

12. The apparatus of claim 11 wherein said mirror means comprises means for reflecting incoming light defined by an input cone through an aperture in which the tip of said fiber optic bundle resides.

13. The apparatus of claim 11 wherein said mirror means comprises means for reflecting light rays in said input cone at angles such that no reflected ray has an angle which exceeds the acceptance angle of said fiber optic bundle.

14. The apparatus of claim 11 wherein said mirror means is a polished, parabolic surface having aperture at the narrow end therof which approximately matches the diameter of said fiber optic bundle, and wherein the shape of said parabolic surfaces is such that each line on the parabolic surface has a focal point which is at the intesection of the diagonally opposite line on the parabola and the edge of said aperture.

15. The apparatus of claim 11 wherein said mirror means is a polished, parabolic surface defined by the expression $$Y^2 = 4(0.0225)X$$

where X is the coordinate along the long axis of the parabola and Y is the coordinate along an axis perpendicular to X, and further comprising an aperture in the narrow end of said parabola which has a diameter which is defined by the focal points of all lines in the parabolic surface.

* * * * *